Dec. 18, 1962     R. F. MOSS     3,068,947
WEIGHING SCALE
Filed Dec. 2, 1958     2 Sheets-Sheet 1
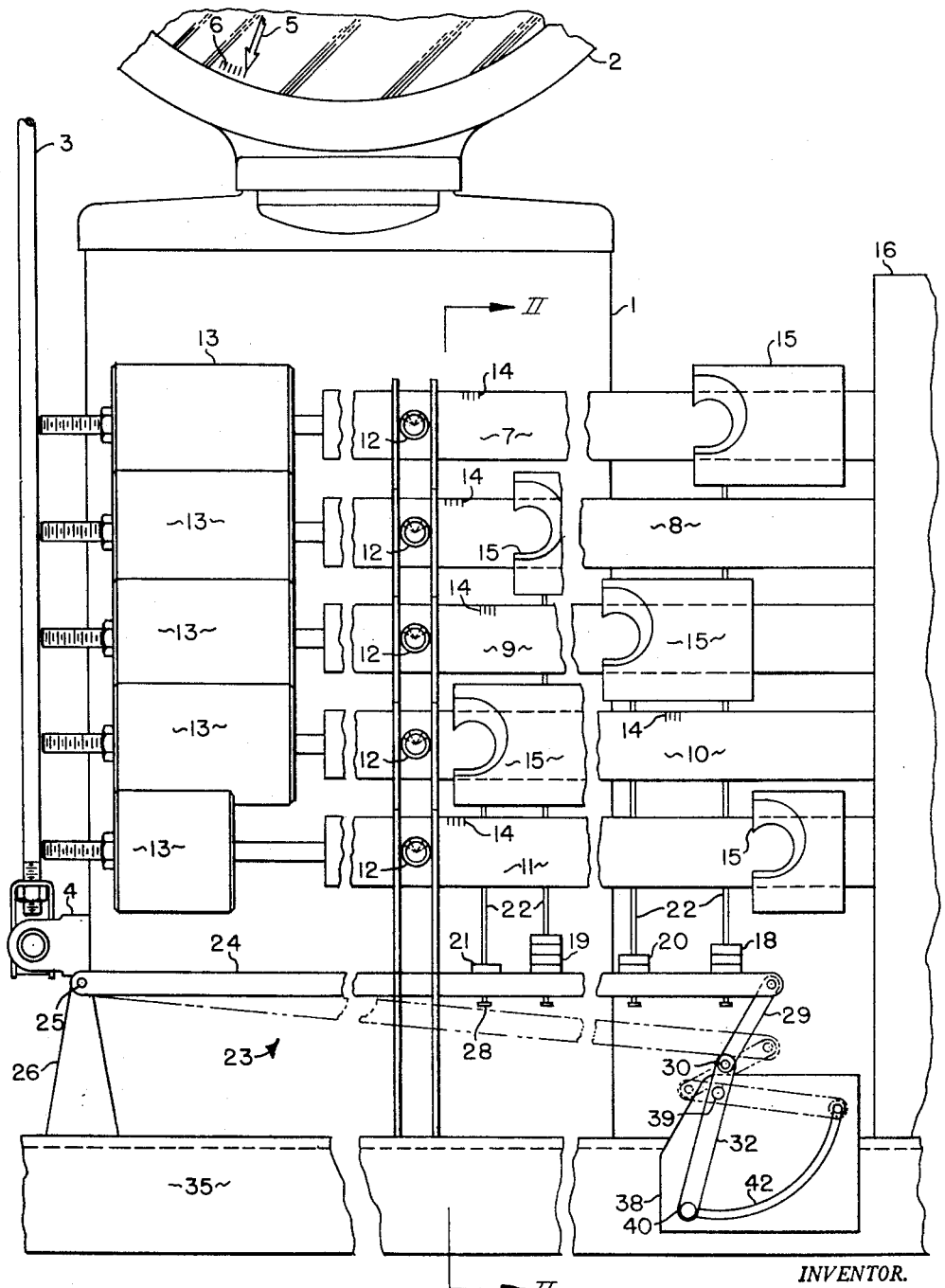
*Fig. I*
INVENTOR.
ROBERT F. MOSS
BY
Marshall, Marshall & Yeasting
ATTORNEYS

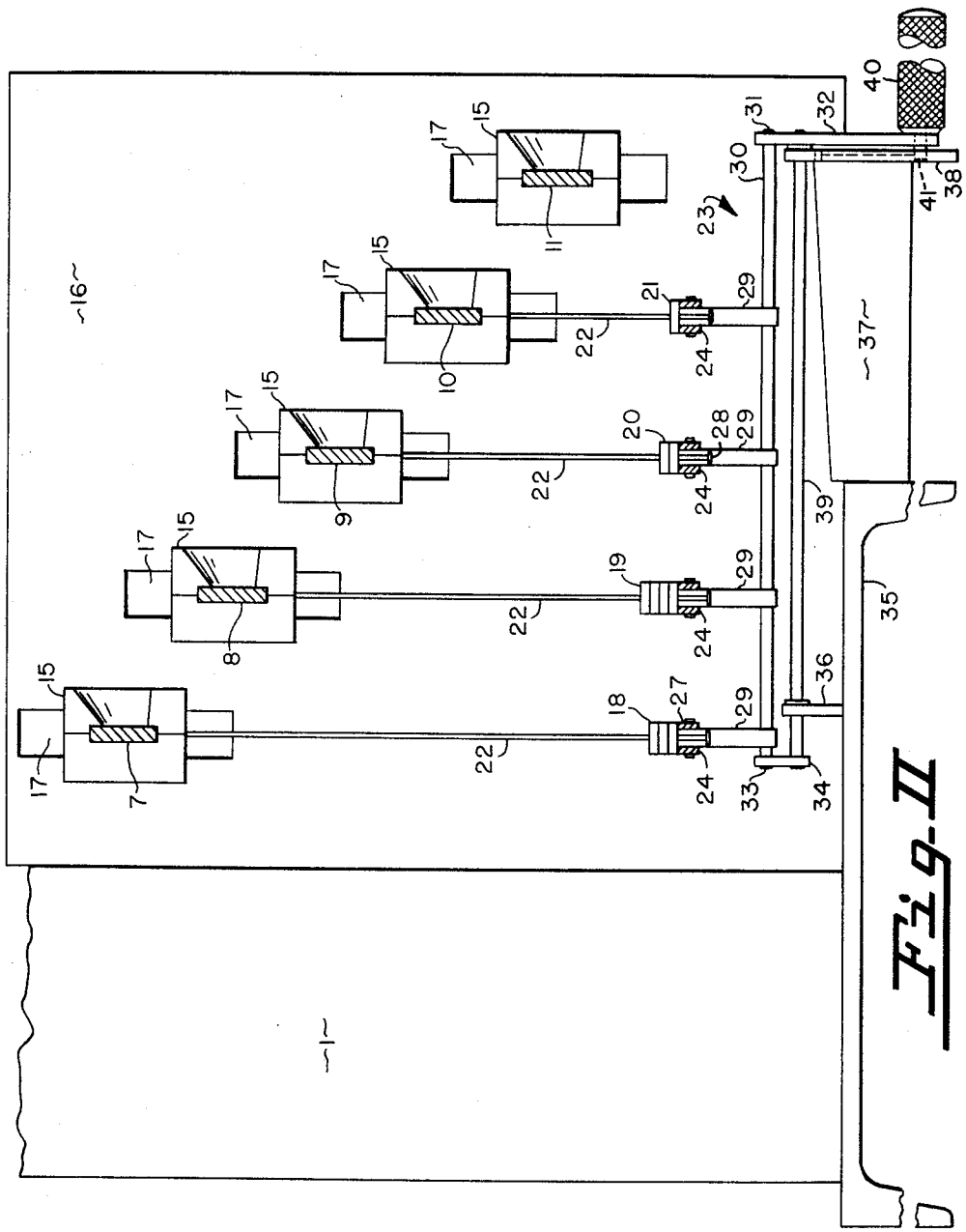

United States Patent Office 3,068,947
Patented Dec. 18, 1962

3,068,947
WEIGHING SCALE
Robert F. Moss, Elizabeth, N.J., assignor to Toledo Scale Corporation, Toledo, Ohio, a corporation of Ohio
Filed Dec. 2, 1958, Ser. No. 777,776
8 Claims. (Cl. 177—171)

This invention relates generally to weighing scales, and more particularly to multiple beam batching scales.

In laboratory tests of concrete mixed from various proportions of ingredients, it has been found that a small variation in proportions, particularly in the ratio of water and cement, often makes a very large variation in the ultimate strength of the finished concrete. In commercial practice, a multiple beam batching scale often is used in weighing out such ingredients, there being a beam on such a scale for each ingredient. In operation, a slidable poise on each one of the beams is set to a point which will cause the correct weight of the ingredient associated with the beam to be weighed out, the ingredients being weighed out successively.

Heretofore, it has been the practice in some commercial batching of concrete, in order to approach the accurate control of the final properties of the concrete which are obtained in the laboratory, to compensate for the moisture contained in the "dry" ingredients by adding moisture percentage weights to the poises which correspond to the dry ingredients so that the weights of such ingredients which are weighed out are equal to the weights of the dry ingredients plus the weights of the moisture contained therein. Since such ingredients supply to the batch a certain amount of water, this is subtracted from the amount of water to be weighed out. Perhaps the easiest way to perform the subtraction is to set the poise on the beam associated with the water ingredient to the point which normally will cause the given batch weight of water to be weighed out and then to remove the moisture percentage weights from the other poises so that the weighing system adds the water indicated on the water beam less the amount of water already supplied to the batch by the moisture contained in the dry ingredients.

Heretofore, the steps of replacing the moisture percentage weights on the poises associated with the dry ingredients to condition the scale for the next weighing cycle and then removing them before the addition of water to the next batch have been done manually. To weigh hundreds of batches accurately requires the operator to remove the weights hundreds of times and to replace them properly. Should there be, for example, 5% moisture in the sand and 4% moisture in the coarse aggregate and the operator makes the mistake during the routine of taking the weights off and then returning them of putting the 5% weight on the poise for the coarse aggregate and the 4% weight on the poise for the sand, serious weighing errors occur. A simple concrete mixture may contain four dry ingredients, i.e., cement, fine aggregate, coarse aggregate, and sand, all of which may contain moisture in varying amounts. In weighing out the ingredients for such a mixture, even a conscientious operator of long experience is apt to get the percentage weights mixed up when he goes through the routine hundreds of times. Furthermore, the manual handling of the percentage weights is time consuming.

It is, accordingly, the principal object of this invention to provide, in a multiple beam batching scale, mechanical means for replacing weights on and removing such weights from the dry ingredient poises of the scale mechanism to eliminate the human factor previously present in the replacing and removing of such weights.

More specific objects and advantages are apparent from the following description of a specific embodiment of the invention.

According to the invention, a mechanical lifter is provided for selectively replacing moisture percentage weights on and removing such weights from the dry ingredient poises of a multiple beam batching scale which is used in a concrete batching system. In order to compensate for the moisture contained in the dry ingredients, percentage weights are added initially in the usual way, i.e., by hand, so that the weights of such ingredients which are weighted out are equal to the desired weights of the ingredients on a dry basis plus the weights of the moisture contained therein.

Since such dry ingredients supply to the batch a certain amount of water, this is subtracted from the amount of water to be weighed out by lifting the percentage weights out of their operative positions, before the addition of water to the batch, by means of the lifter of the invention so that the batching system adds the water indicated on the water beam of the multiple beam scale less the amount of water already supplied to the batch by the moisture contained in the dry ingredients.

Once the selected percentage weights are in place, they are never touched by hand again until the moisture content of one of the ingredients changes and, thus, requires the selection of a different weight. After the addition of water to the batch, the lifter replaces the weights on thier respective poises to condition the scale for the next weighing cycle. The lifter is able to remove the percentage weights from their operative positions no matter where the ingredient poises happen to be located on the beams so that batches can be made of various proportions of ingredients without the need for manually handling the percentage weights beyond their initial selection and positioning.

The percentage weights are handled manually after their initial selection only when changing from one percentage size of weight to another, the selected ones of the weights being cyclically lifted from their respective poises and then replaced by the lifter. This eliminates the human factor previously present in the replacing and removing of the percentage weights. If hundreds of batches are made in a day from ingredients having the same moisture contents and even though some of the batches may have proportions of ingredients which are different from others, the percentage weights need be placed by hand in their operative positions only once at the beginning of the day; thereafter, the percentage weights are lifted off and replaced on the poises by the lifter without chance that the weights will get mixed up through human error. Furthermore, all of the percentage weights are moved by the lifter simultaneously so that the batching cycle can be speeded up.

The invention may be more readily understood from the following detailed description of a specific embodiment in which description reference is made to the accompanying drawings.

In the drawings:

FIG. I is a fragmentary front elevational view of a multiple beam batching scale embodying the percentage weight lifter of the invention; and FIG. II is a vertical sectional view taken along the line II—II of FIG. I.

These specific drawings and the accompanying description are intended merely to illustrate the invention but not to limit its scope.

The weighing scale illustrated in FIG. I is a multiple beam scale of the drop beam type; it comprises a cabinet 1 which is surmounted by a dial housing 2. Overhead load receiving mechanism (not shown) of the type commonly employed for receiving ingredients of a mixture, such as concrete, is operatively connected to a steelyard 3 that is connected to a lever 4 which is pivotally mounted in the cabinet 1, the lever 4 being operatively connected to ordinary automatic load counterbalancing mechanism (not shown), such as springs or pendulums, enclosed within the dial housing 2. A detailed illustration and description of an ordinary multiple beam scale of the drop beam type is contained in U.S. Patent No. 2,467,300, issued on April 12, 1949 to H. L. Fate. Load forces to be counterbalanced are transmitted from the lever 4 to the automatic load counterbalancing mechanism, an indicator 5 cooperating with a series of indicia 6 marked on the face of a chart within the dial housing 2 to indicate the weights of loads that are counterbalanced by the automatic load counterbalancing mechanism.

Associated with the load counterbalancing mechanism are a series of auxiliary weighing beams 7, 8, 9, 10, and 11, each provided with a pivotal fulcrum support 12 and a screw weight 13 to obtain a balanced condition of the beam and each being located in different vertical planes as illustrated in FIG. II. Each of these auxiliary beams also includes a scale 14, shown only fragmentarily, and a poise 15 cooperating therewith for the setting of an appropriate weight of material to be used in a mixture. These various auxiliary beams may be used, for example, in proportioning the amount of cement, fine aggregate, coarse aggregate, sand, and water to be employed in a given mixture of concrete. Any one of the auxiliary weighing beams can be operatively connected to the load counterbalancing mechanism by means of latching members suitably mounted within a case 16, the right hand ends of the beams as viewed in FIG. I extending through openings 17 (FIG. II) in the case 16 into such case. The latching members are not shown for the sake of simplicity; however, similar members are shown and described structurally and functionally in detail in the hereinbefore mentioned U.S. Patent No. 2,467,300.

In general operation, the desired weights of the different ingredients are set on the respective auxiliary weighing beams by moving the poises to selected positions with the beams in latched, inoperative condition. Each auxiliary weigh beam is unlatched and "dropped," i.e., connected to the weighing mechanism, as the ingredient to which it corresponds is being added to the overhead load serving mechanism, the unlatching and weighing operations being performed successively. After a batch of material has been weighed and discharged, the weighing apparatus is conditioned for the next batch by disconnecting and relatching the auxiliary weighing beams. When the first one of the beams is dropped, the indicator 5 is rotated from the zero indicium in the series of indicia 6, i.e., the position show in FIG. I, in a clockwise direction to indicate the weight of the ingredient which corresponds to such first one of the beams. As the ingredient is added to the overhead load receiving mechanism, the indicator 5 returns toward the zero indicium and indicates zero when the full amount of the ingredient has been added. The indicator 5 repeats this cycle as each beam is dropped and as each ingredient is added successively.

The upper four of the five beams, i.e. beams 7, 8, 9, and 10, are used for dry ingredients. These ingredients for the purpose of illustration may be cement, fine aggregate, coarse aggregate, and sand. Since such dry ingredients usually contain moisture, it is necessary in order to secure the desired amount of dry ingredients actually to weigh out the desired amount of each dry ingredient plus a percentage more corresponding to the percentage of water carried therein. This is accomplished by means of removable moisture percentage weights 18, 19, 20, and 21 which are suspended from the poises on beams 7, 8, 9, and 10, respectively, by means of hangers 22 one of which depends from each of such poises. The hangers 22 are adapted at their lower ends to receive the removable weights. Each one of the removable moisture percentage weights 18, 19, 20, and 21 weighs a certain percent of one of the poises 15 associated with the beams 7, 8, 9, and 10, all of such poises 15 on the beams for the dry ingredients weighing exactly the same, The percentage weights which are illustrated are from a set which is provided with each weighing scale, there being enough weights in the set to cover the usual percent by weight ranges of water carried in the usual ingredients that are used in making concrete.

For the purposes of illustration, assume that the ingredient corresponding to beam 7 contains 3% water by weight, the ingredient corresponding to beam 8 contains 4% water by weight, the ingredient corresponding to beam 9 contains 2% water by weight, and the ingredient corresponding to beam 10 contains 1% water by weight. The setting of the poises 15 is accomplished as follows: Poise 15 on beam 7 is set at the figure on scale 14 of beam 7 which normally would cause to be weighed out the desired weight on a dry basis of the ingredient corresponding to beam 7. Since there is 3% moisture in such ingredient, it is necessary in order to secure the desired amount of dry ingredient actually to weigh out 3% more of the wet material. To do this, percentage weight 18 is placed on the hanger 22 depending from the poise associated with the beam 7. Weight 18 weighs 3% of the weight of the poise associated with beam 7 and is clearly so marked.

Similarly, poises 15 on beams 8, 9 and 10 are set at the proper figures on the scales on such beams. Since there is 4% moisture in the ingredient corresponding to beam 8, percentage weight 19 is placed on the hanger depending from the poise associated with beam 8. Weight 19 weighs 4% of the weight of the poise associated with beam 8. Since there is 2% moisture in the ingredient corresponding to beam 9, percentage weight 20 is placed on the hanger depending from the poise associated with beam 9. Weight 20 weighs 2% of the weight of the poise associated with beam 9. Since there is 1% moisture in the ingredient corresponding to beam 10, percentage weight 21 is placed on the hanger depending from the poise associated with beam 10. Weight 21 weighs 1% of the weight of the poise associated with beam 10.

Poise 15 on beam 11 is set at the figure on the beam's scale 14 which would normally cause to be weighed out the desired weight of water. Since the ingredients which correspond to beams 7, 8, 9, and 10 have each supplied to the batch a certain amount of moisture, this must be subtracted from the amount of water to be weighed out. The subtraction, heretofore, has been accomplished simply by removing by hand all of the percentage weights 18, 19, 20, and 21 from the scale before the addition of water to the batch. With the foregoing arrangement, when water beam 11 is "dropped," the indicator 5 does not move around to the same figure on the chart as is set on beam 11, but rather its stops at a fiigure which represents the difference between the figure set on beam 11 and the sum of the weights of water already supplied to the batch by the dry ingredients. Hence, when the indicator 5 returns to zero only the desired or given weight of water has been added to the batch. Also, heretofore, the scale has been conditioned for the next weighing cycle by returning the percentage weights to their operative positions by hand.

In a high production batching plant, an operator is required to weigh out one batch after another. The proportions of ingredients may remain the same for many batches or they may change frequently. However, the moisture contents of the ingredients do not change rapidly and the operator may weigh out many batches with ingredients having the same moisture contents. To weigh hundreds of batches accurately requires the operator to remove the percentage weights hundreds of times before the additions of water and then to replace them properly. Should the operator, for example, make the mistake of returning weight 19 to the hanger 22 that should receive weight 18 and returning weight 18 to the hanger 22 that should receive weight 19 serious weighing errors might occur in many batches before the error was discovered. Such manual handling of the percentage weights also is unsatisfactory because it is time consuming.

The human factor previously present in the replacing and removing of the percentage weights is eliminated through the use of the mechanical weight lifter 23 of the invention; it comprises four spaced levers 24 that are pivotally mounted on a fulcrum rod 25 which is supported by means of a pair of spaced brackets 26 secured to the cabinet 1. Only the forward one of the brackets 26 can be seen in FIG. I. A lever 24 is provided for each one of the beams 7, 8, 9, and 10, the levers 24 being located underneath such beams and being so spaced along the fulcrum rod 25 that there is a lever 24 located in each one of the vertical planes of the beams.

Each of the levers 24 is formed of a pair of bars 27 which are so spaced that the end 28 of the corresponding hanger 22 which receives the removable percentage weights is able to pass without touching between the bars 27, the lengths of the hangers 22, which like the levers 24 are located in the vertical planes of the beams, being such, although the beams are at various elevations, that the ends 28 of the hangers 22 are located in a horizontal plane which is juxtaposed to the levers.

Each of the ends of the levers 24 remote from the fulcrum rod 25 is pivotally connected to a link 29 which is pivotally connected in turn to a horizontal rod 30 that is pivotally supported at one of its ends at 31 on an operating lever 32 and that is pivotally supported at the other one of its ends at 33 on a link 34. The links 29, like the hangers 22 and the levers 24, are located in the vertical planes of the respective beams 7, 8, 9, and 10.

A base 35 which serves to support the cabinet 1 also functions to support a bearing bracket 36 and a base extension 37 to which is attached a vertical plate 38. A shaft 39 is journaled in the bracket 36 and in the vertical plate 38 and is secured at its right hand end as viewed in FIG. II to the operating lever 32 so that it is turned about its axis when the lever is turned. The other end of the shaft 39 is secured similarly to an end of link 34 so that such link and the operating lever 32 move about the axis of the shaft 39 as one. A handle 40 is secured to the free end of the operating lever 32, there being a pin 41 on the handle 40 which is guided in a curved slot 42 in the plate 38.

When the handle 40 is moved to the left hand end of the slot 42 as viewed in FIG. I, the elements of the weight lifter 23 assume their positions which are illustrated in solid lines. Movement of the handle 40 to such position turns the shaft 39 and link 34 attached thereto and lifts links 29 operatively connected to link 34 and to the handle 40 to pivot the levers 24 counterclockwise about the axis of fulcrum rod 25 and, thus, to elevate the levers. In moving to their elevated positions, the levers 24 lift the percentage weights 18, 19, 20, and 21 from the ends 28 of the hangers 22 as illustrated in FIGS. I and II. Since the levers 24 are located in the vertical planes of the beams 7, 8, 9, and 10 closely adjacent the horizontal plane in which the ends 28 of the hangers 22 are and since the levers 24 are as long as the effective lengths of the beams, in moving to their elevated positions, the levers 24 remove all of the percentage weights from their operative positions irregardless of where the poises happen to be set on the beams. When the handle 40 is moved to the right hand end of the slot 42, the weight lifter 23 assumes its position which is illustrated in broken lines to return the percentage weights to their operative positions.

In operation, the poises 15 on beams 7, 8, 9, and 10 are set at the figures on their scales 14 which normally would cause to be weighed out the desired weights on a dry basis of the ingredients corresponding to such beams and the poise 15 on beam 11 is set at the figure on its scale which normally would cause to be weighed out the given batch weight of water. Then, percentage weights of the correct weights are selected and placed by hand on the hangers 22, the percentage weight lifter 23 being in its bottom position at this point in the weighing cycle. Beams 7, 8, 9, and 10 are "dropped" successively to add their ingredients to the batch and then the weight lifter 23 is moved to its upper position to simultaneously lift the percentage weights from their operative positions. As soon as the weight lifter has removed the percentage weights, the water beam 11 is "dropped" to add the weight of water indicated on the water beam less the amount of water already supplied to the batch by the moisture contained in the dry ingredients. This completes the batch and the weight lifter 23 is returned to its bottom position to simultaneously return the percentage weighs to their operative positions to condition the scale for the next weighing cycle.

Once the selected percentage weights are in place, they are never touched by hand again until the moisture content of one of the ingredients changes and, thus, requires the selection of a different weight. The lifter 23 is able to remove the weights from their operative positions no matter where the poises happen to be located on their beams so that batches can be mixed of various proportions of ingredients without the need for manually handling the percentage weights beyond their initial selection and positioning on the hangers 22, the selected ones of the weights being cyclically lifted from their operative positions before the addition of water to the batch and then returned after such addition by the lifter 23. Use of the mechanical weight lifter eliminates the human factor previously present in the replacing and removing of the percentage weights by hand. This eliminates errors caused by operators mixing up the weights and greatly speeds up the weighing cycles.

The embodiment of the invention that has been disclosed may be modified to meet various requirements.

I claim:

1. In a multiple beam batching scale, in combination, a plurality of pivotally mounted beams each in different vertical and horizontal planes from the others, movable poises one on at least two of the beams, at least one removable weight for each of the poises to selectively increase the load offsetting capacities of the poises from first capacities to second capacities, hangers having lower ends adapted to receive the weights depending from the poises, said hanger ends being located below the lower one of the weight carrying beams, and a plurality of lifters movable as one in paths fixed relative to the scale for selectively removing the weights to return the poises to the first capacities and for selectively replacing the weights to return the poises to the second capacities.

2. A multiple beam batching scale according to claim 1 wherein handle means operatively connected to the lifters is provided for moving the lifters.

3. A multiple beam batching scale according to claim 2 wherein the handle means includes a pivotally mounted handle.

4. A multiple beam batching scale according to claim 3 wherein the handle means further includes means defining two operating positions for the handle and means so operatively connecting the lifters to the handle that the handle tends to stay in the operating position in which it is put.

5. In a multiple beam batching scale, in combination, a plurality of pivotally mounted beams each in different vertical and horizontal planes from the others, movable poises one on at least two of the beams, at least one removable weight for each of the poises to selectively increase the load offsetting capacities of the poises from first capacities to second capacities, hangers having lower ends adapted to receive the weights depending from the poises, said hanger ends being located below the lower one of the weight carrying beams, and a plurality of lifters movable about a common axis in paths fixed relative to the scale for selectively removing the weights to return the poises to the first capacities and for selectively replacing the weights to return the poises to the second capacities.

6. A multiple beam batching scale according to claim 5 wherein handle means operatively connected to the lifters is provided for moving the lifters.

7. A multiple beam batching scale according to claim 6 wherein the handle means includes a pivotally mounted handle.

8. A multiple beam batching scale according to claim 7 wherein the handle means further includes means defining two operating positions for the handle and means so operatively connecting the lifters to the handle that the handle tends to stay in the operating position in which it is put.

References Cited in the file of this patent

UNITED STATES PATENTS

| | | |
|---|---|---|
| 115,268 | Baker et al. | May 30, 1871 |
| 195,112 | Fairbanks et al. | Sept. 11, 1877 |
| 1,999,312 | Zeissl | Apr. 30, 1935 |
| 2,400,972 | Bell | May 28, 1946 |
| 2,467,300 | Fate | Apr. 12, 1949 |